W. E. BUTLER.
DENTAL MOTOR.
APPLICATION FILED SEPT. 3, 1909.
984,507.
Patented Feb. 14, 1911.
2 SHEETS—SHEET 2.
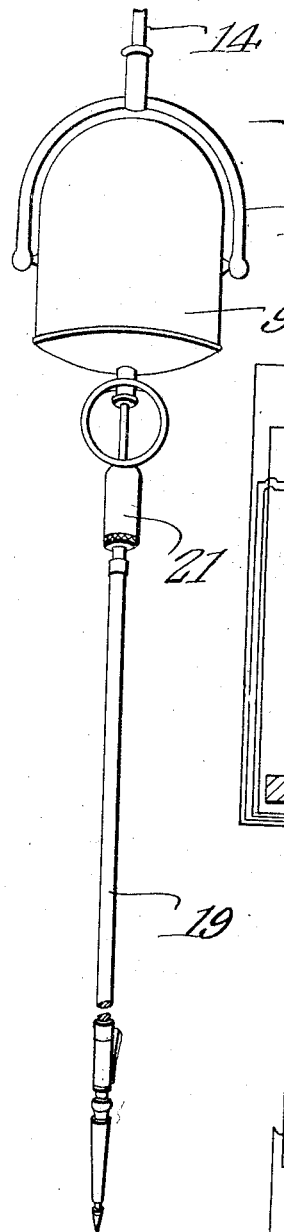
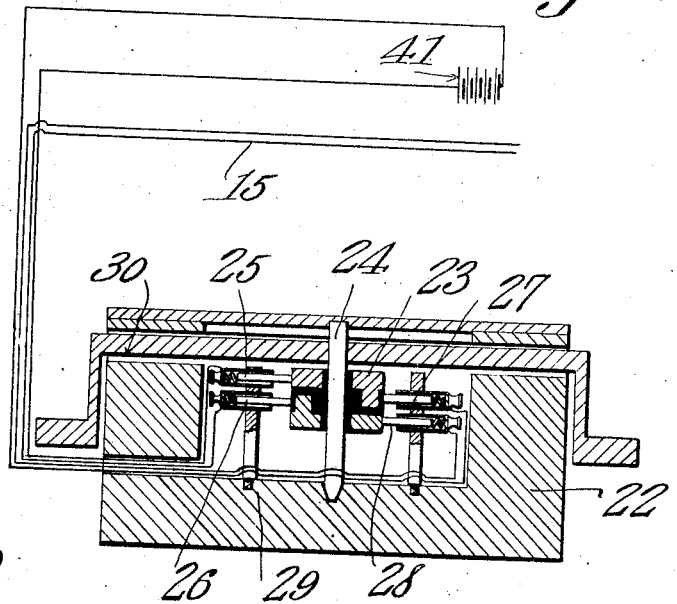
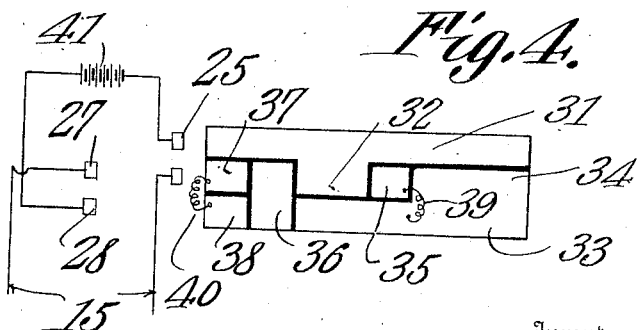
Inventor
William E. Butler.
By C. A. Snow & Co.
Attorneys
Witnesses

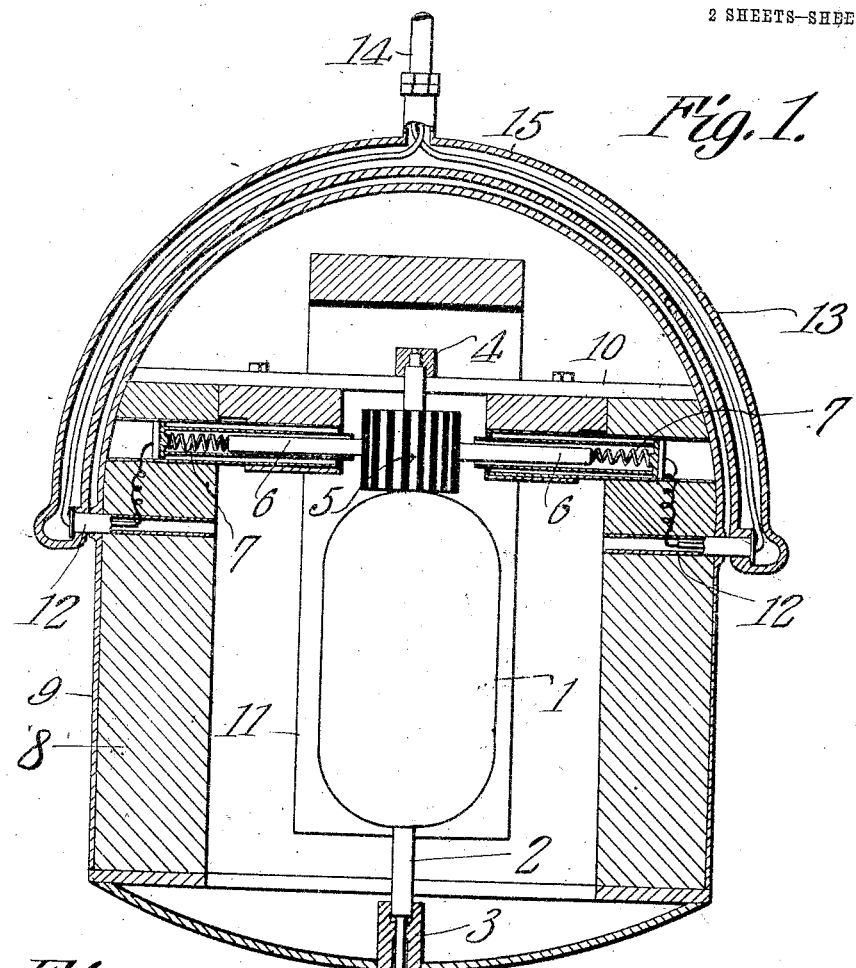

UNITED STATES PATENT OFFICE.

WILLIAM E. BUTLER, OF DAVID CITY, NEBRASKA.

DENTAL MOTOR.

984,507.      Specification of Letters Patent.      Patented Feb. 14, 1911.

Application filed September 3, 1909. Serial No. 516,032.

*To all whom it may concern:*

Be it known that I, WILLIAM E. BUTLER, a citizen of the United States, residing at David City, in the county of Butler and State of Nebraska, have invented a new and useful Dental Motor, of which the following is a specification.

This invention has reference to improvements in dental motors and is designed to provide a motor for dental work capable of being operated by battery power either by primary batteries or by storage batteries, and furthermore the motor is designed to be quick stopping when the power is shut off and to be capable of reversal of motion and varying speed with but one pair of line conductors.

The invention will be best understood from a consideration of the following detailed description taken in connection with the accompanying drawings forming a part of this specification, in which drawings—

Figure 1 is a central section through a motor embodying the invention. Fig. 2 is a perspective view on a small scale showing the motor and mechanical connections. Fig. 3 is a diagram of the controlling means for the motor with parts shown in section. Fig. 4 is a diagram showing the commutator connections of the controller. Fig. 5 is a view, on a smaller scale than Fig. 3, of a slightly modified form of controller.

Referring to the drawings there is shown a motor comprising an armature 1 mounted on an armature shaft 2 and at the lower end this shaft is provided with a step bearing 3 which may be in the form of a ball bearing while at the upper end the shaft is provided with a suitable bearing 4.

For electrical reasons the bearings 3 and 4 and the shaft 2 may be made of some non-magnetic metal such as brass or bronze.

Mounted on the shaft 2 is a commutator 5 upon which bear brushes 6 urged into contact with the commutator by suitable springs 7 and these brushes and their holders are mounted in blocks 8 fast to the inner walls of a suitable casing 9 which blocks are secured together by a yoke 10, also of non-magnetic material and serving to support the bearings 4. The yoke 10 may also serve as a support for the magnet 11 of the motor. This field magnet is in the form of a permanent magnet between the legs of which the armature 1 and commutator 5 are located.

The blocks 8 carry trunnions 12 which project beyond the casing 9 and are supported in a hollow bail 13 fast at the center to a flexible supporting cable 14 suspended from some fixed support and this cable 14 may contain conductors 15 extending through the hollow bail and through the trunnions 12 and connected respectively to the brushes 6.

The shaft 2 is continued through the bearing 3 as indicated at 16 and terminates in one member 17 of a friction clutch, the other member 18 of which is carried by one end of a flexible shaft 19 such as is commonly used in dental machines. A spring 20 urges the two members of the friction clutch 17 and 18 into constant engagement. A casing 21 serves to house the said friction clutch and the spring 20.

In order to control the motor there is provided a controlling device best shown in Figs. 3 and 4. This device may comprise a block 22 hollowed out for the reception of a commutator 23 mounted on a vertical shaft 24 having bearings in the block and engaging the commutator are brushes 25, 26, 27, and 28 respectively, these brushes being urged against the commutator constantly by suitable springs and are supported on posts 29 in the hollow portion of the block.

An arm 30 carried by the upper end of the shaft 24 and above the block 22 is designed to be engaged by the foot of an operator so that the shaft 22 and with it the commutator 23 may be turned from point to point at the will of the operator. A suitable index, not shown, may be employed for positioning the foot member 30. As shown in Fig. 4, the regulating commutator may consist of a block 31 surrounding the shaft and having a side extension 32. Another plate or block 33 is provided of less length than the block 31 and also has a side extension 34 of greater longitudinal extent than the extension 32 of the plate or block 31. There are provided other blocks 35, 36, 37, and 38 disposed substantially as shown in Fig. 4. The block 35 is insulated from the blocks or plates 31 and 33 but is connected to the block or plate 33 by a resistance 39. The plates 37 and 38 are insulated one from the other and from the other plates or blocks but are connected together through a resistance 40 which may be similar to the resistance 39.

The brushes 25 and 26 are so disposed as to make contact with the commutator, the brush 25 making contact at all times with the block or plate 31 while the contact 26 is so disposed as to make contact with the blocks 37, 36, extension 32 block 35 and extension 34 of the block 33 in order.

The block 27 is so disposed as to make contact with the same blocks and parts of the blocks as the brush 26 but at a point spaced therefrom so that with the single exception of the extension 34 of the block 33 the two brushes 27 and 26 at no time are bridged by any one block. The brush 28 is so disposed as to make contact with the blocks 38, 36, and 33 in succession.

If the commutator be moved to a sufficient extent the brushes 25 and 26 are brought into engagement with the block 31 and its extension 32 respectively and the brushes 27 and 28 are brought into engagement with the blocks 37 and 38 respectively. The brushes 25 and 28 are connected together through a battery 41 while the brushes 26 and 27 are connected to the conductors 15 leading to the motor. There is now established a circuit from the battery 41 to the brush 25 thence to the plate 31 and to its extension 32, thence to the brush 26 and by an appropriate conductor 15 to the armature to the motor thence returning by the other conductor 15 to the brush 27 and plate 37 thence by way of the resistance 40 to the block 38, thence to the brush 28 and back to the battery 41 thus completing a circuit from the battery to the motor in a certain direction but with the current reduced because of traversing the resistance 40. The motor will now run in a certain direction at a certain speed and may be used by the dentist for driving any of the usual tools through the flexible shaft 19 in the usual manner.

If it be found desirable to increase the speed of the motor then the commutator 23 is turned until the brushes 27 and 28 are upon the block 36 thus maintaining the relation of the circuit without including the resistance 40 and the motor will increase in speed because of the augmented current furnished, but the direction of rotation of the armature remains as before.

If for any reason it be desired to reverse the direction of rotation of the motor the commutator 23 may be moved still farther when the brushes 25 and 26 will be brought upon the block 31 and the block 35 respectively while the brushes 27 and 28 will engage the extension 32 of the block 31 and the block 33 respectively. There is now established a circuit from the battery 41 to the brush 25 thence to the block 31 and its extension 32 thence by the brush 27 to the motor through the respective conductor 15 and returning by the other conductor 15 to the brush 26, thence to the block 35 and through the resistance 39 to the block 33 thence by the brush 28 back to the battery thus reversing the direction of current to the armature of the motor and thereby reversing the direction of rotation of said armature. If the higher speed be desired then a still further movement of the commutator 23 will bring the brushes 25 and 26 onto the blocks 31 and extension 34 of the block 33 respectively while the brushes 27 and 28 still remain upon the extension 32 of the block 31 and the block 33, thus maintaining the current in the same direction but cutting out the resistance 39 and the motor will revolve at a greater speed but in the same direction as before.

Suppose that it be desirable to stop the motor then the commutator 23 is moved still farther until the brushes 26 and 27 are brought upon the extension 34 of the block 33 thus short circuiting these brushes and since the motor has been rotating at high speed it will become a generator and develop current and the load thus put upon the armature will very quickly bring it to rest since it acts directly as a brake upon the armature. In dental work this is often very important but will not occur with motors not provided with a permanent field d the momentum of the armatures of such motors will sometimes drive them for an appreciable time after the current has been cut off.

By coupling up the flexible shaft 19 to the motor armature through a friction clutch there is no danger of the continued rotation of the dental tool should an obstruction be met with and danger to the tool and to the teeth of the patient is avoided.

In the showing of Fig. 3, the arm 30 extends diametrically across the block 22. It is found in practice that a more convenient arrangement is to have the two ends of the arm 30 disposed at an angle one to the other as shown in Fig. 5, and this arm may be constrained to a central or neutral position by leaf springs 42.

What is claimed is:

1. A dental motor provided with a permanent field and a wound armature, and means for supplying current to and controlling the motor comprising a single pair of main conductors leading to the armature of the motor, two pairs of circuit terminals in said main conductors, and a series of contacts in co-active relation to the circuit terminals and grouped to couple the current source to the motor in one direction, then in the other direction, and to then short-circuit the motor armature, all in one progressive movement of said contacts.

2. A dental motor provided with a permanent field and a wound armature, and means for supplying current to and controlling the motor comprising a single pair of main conductors leading to the armature of the motor, two pairs of circuit terminals in said main conductors, and a series of contacts in co-active relation to the circuit terminals, predetermined ones of the contacts being connected together by resistances, and the contacts being grouped to couple the current source to the motor in one direction through a resistance, then in the same direction excluding the resistance, then in the other direction through a resistance, then in the same direction as the last named direction but excluding the resistance, and to then short-circuit the motor armature, all in one progressive movement of said contacts.
3. A dental motor provided with a permanent field magnet and a wound armature, a single pair of main conductors for supplying current to the motor, and a controlling means comprising a manually operable rotary commutator separate from the motor and having brushes connected to the source of current and other brushes connected to the armature of the motor through the main conductors, and also having means for coupling the brushes in different orders and for short-circuiting the brushes leading to the motor without affecting the field of the motor.

In testimony that I claim the foregoing as my own, I have hereto affixed my signature in the presence of two witnesses.

WILLIAM E. BUTLER.

Witnesses:
  E. J. DWORAK,
  J. M. EBERLY.